June 19, 1923.
F. KRUSE
1,459,066
SAUSAGE TWISTING DEVICE
Filed Oct. 21, 1922
4 Sheets-Sheet 2
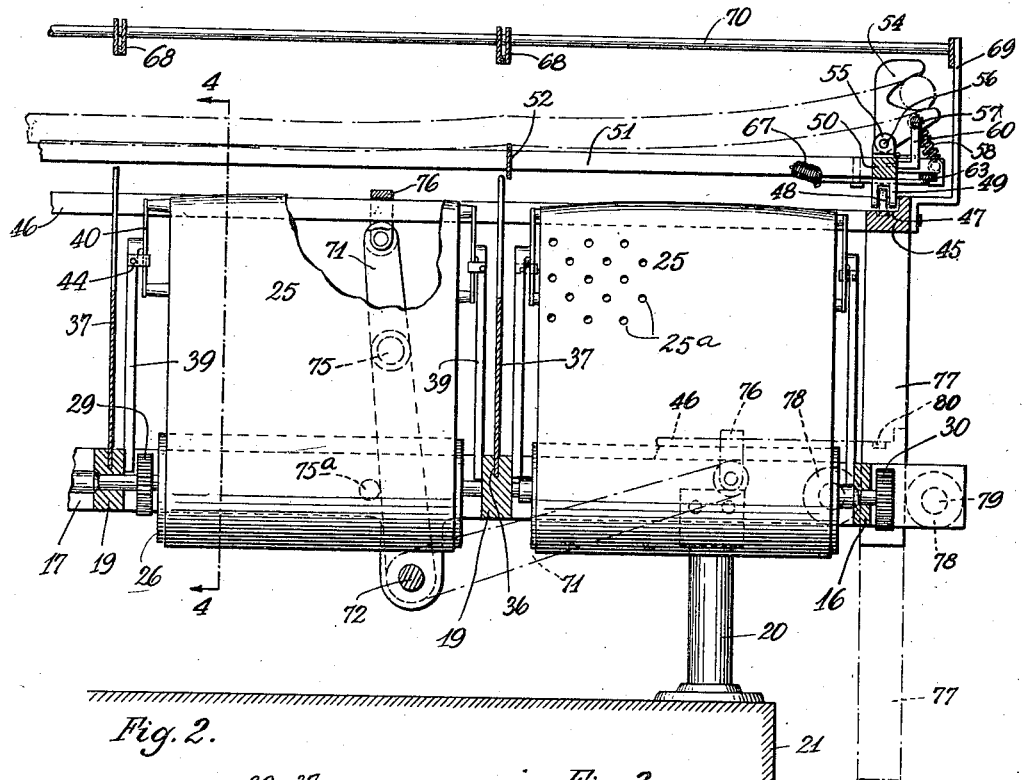
Fig. 2.
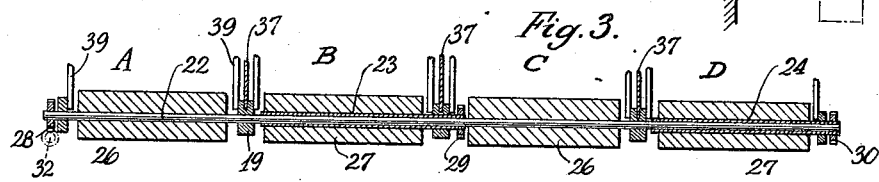
Fig. 3.
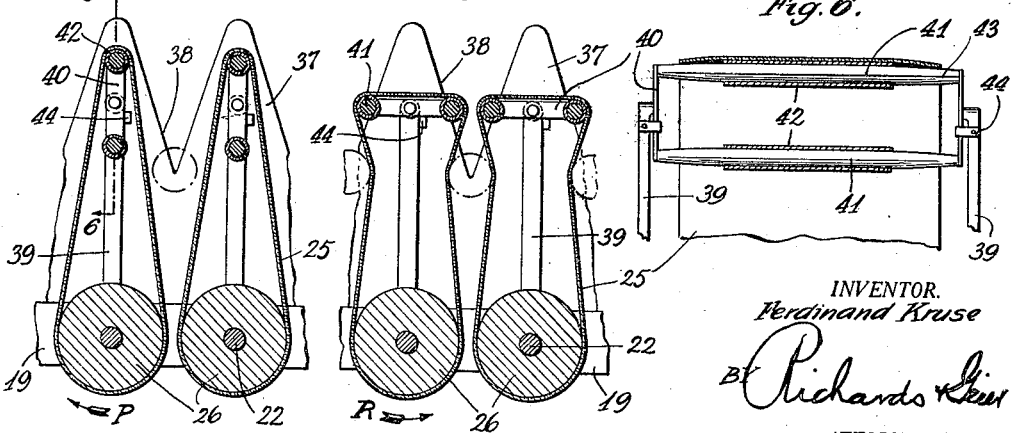
INVENTOR.
Ferdinand Kruse
BY Richards Geer
ATTORNEYS.

June 19, 1923.
F. KRUSE
1,459,066
SAUSAGE TWISTING DEVICE
Filed Oct. 21, 1922
4 Sheets-Sheet 3
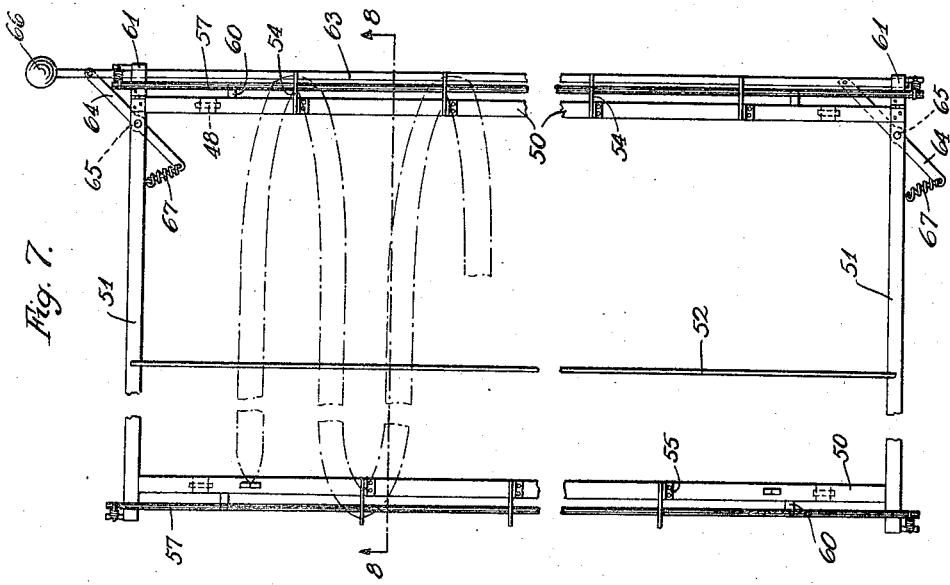
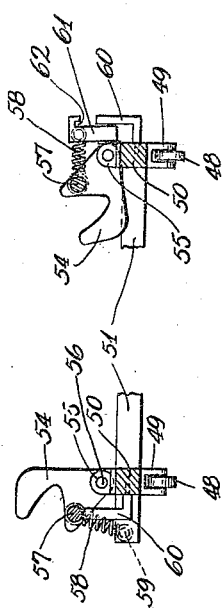
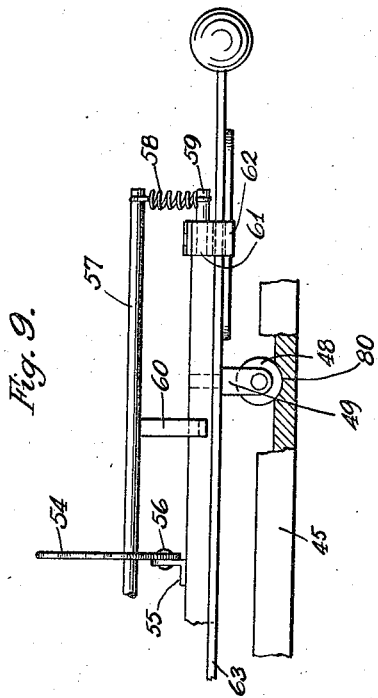
INVENTOR.
Ferdinand Kruse
BY Richards+Geier
ATTORNEYS June 19, 1923.
F. KRUSE
SAUSAGE TWISTING DEVICE
Filed Oct. 21, 1922
1,459,066
4 Sheets-Sheet 4
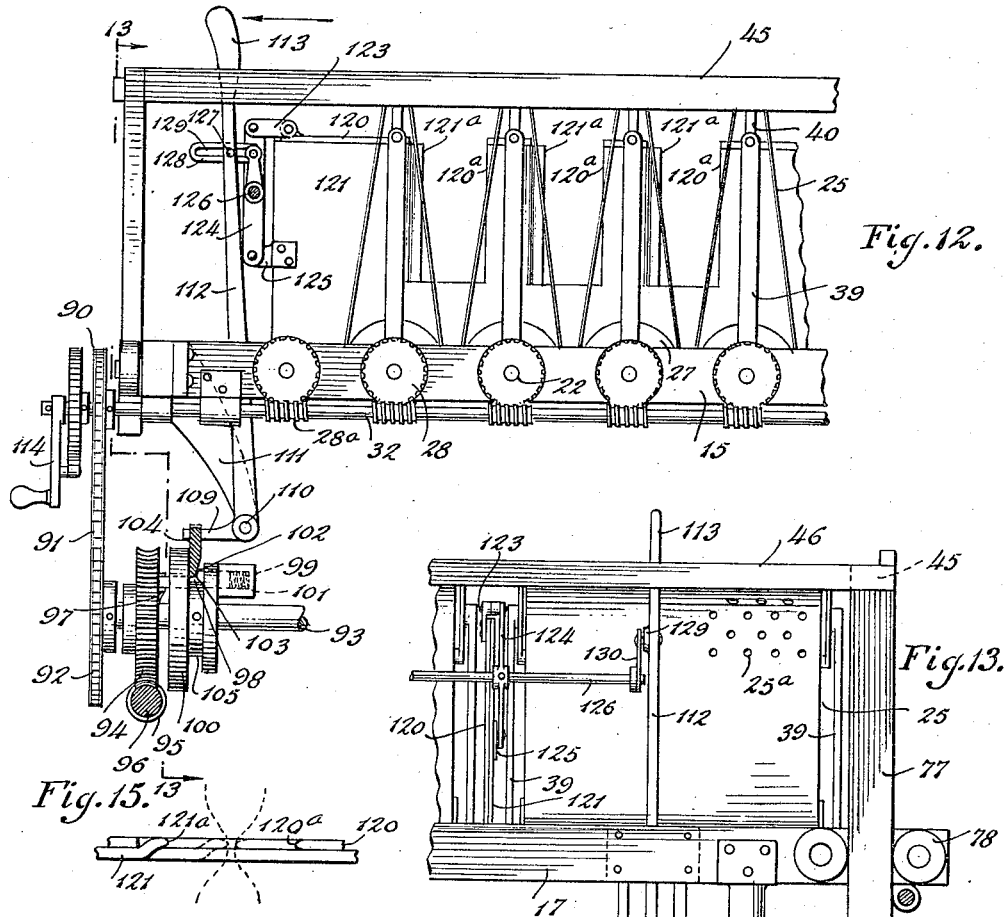
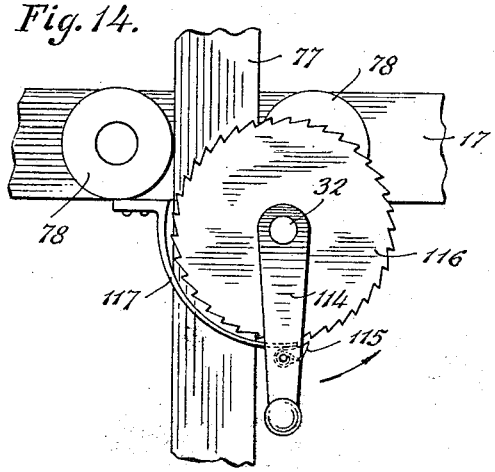
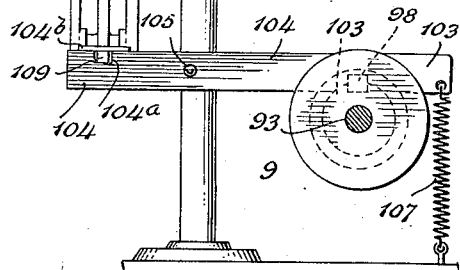
INVENTOR
FERDINAND KRUSE
BY Richards & Geier
ATTORNEYS Patented June 19, 1923.

1,459,066

UNITED STATES PATENT OFFICE.

FERDINAND KRUSE, OF PORT RICHMOND, NEW YORK.

SAUSAGE-TWISTING DEVICE.

Application filed October 21, 1922. Serial No. 595,889.

*To all whom it may concern:*

Be it known that I, FERDINAND KRUSE, a citizen of the United States, residing at Port Richmond, county of Richmond, and State of New York, have invented certain new and useful Improvements in Sausage-Twisting Devices, of which the following is a specification.

The principal object of this invention is to improve upon the construction of the sausage twisting machines shown and described in my prior applications for patents, Serial No. 461,879, filed April 16, 1921, Serial No. 479,461, filed June 22, 1921, Serial No. 528,623, filed January 12, 1922, and Serial No. 559,156, filed May 8, 1922.

Considered more specifically a further object of this invention is to provide an improved construction for opening and closing the belts to permit the convenient insertion or removal of the sausage casing between the spaces between the opposed reaches of the cooperating pairs of belts and embodying means whereby the travel of the belts, as their direction of travel is reversed, causes them to open or close.

Another object of this invention is to provide an improved frame upon which the casings are placed before placing them in the machine, the frame with the casings thereon being then inserted into the machine and removed therefrom when the twisting operation is completed thereby permitting a practically continuous operation of the machine, without any loss of time to thread the casing through the machine. A further object is to provide an improved resilient mounting for certain of the end formers whereby they will yield inwardly to prevent excessive tension upon the casings due to the shortening thereof by the twisting operation.

Another object is to provide power means for operating the machine and to incorporate an automatically operating clutch, to render the connection between the power means and the machine inoperative after a predetermined operation of the belts sufficient to accomplish the twisting of the casings and a further object is to provide a means for squeezing the casings which will be automatically operated to compress the casings simultaneously with the actuation of the power control to start the machine and which squeezing means will be released before the twisting operation is completed thereby preventing breakage of the casings.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings, forming a portion of this specification.

Fig. 2 is a section on the line 2—2 of Fig. 1.

Fig. 3 is a section on a reduced scale on the line 3—3 of Fig. 1.

Fig. 4 is a section on a reduced scale on the line 4—4 of Fig. 2, and showing the belts in open or inoperative position.

Fig. 5 is a view similar to Fig. 4, showing the belts in closed or operative position.

Fig. 6 is a section on the line 6—6 of Fig. 4.

Fig. 7 is a plan view of the separate frame upon which the casings are threaded before placing them in the machine.

Fig. 8 is a broken sectional detail on the line 8—8 of Fig. 7, showing the end formers.

Fig. 9 is a detail in elevation of one end of the separate frame showing the means for operating the end formers and the cooperating locating means on the machine and separate frame.

Fig. 10 is a diagrammatic showing of the relative positions of the separate frame and intermediate formers when in inoperative position, and Fig. 11 is a view similar to Fig. 10, showing the parts in operative position.

Fig. 12 is a modification in side elevation showing different type of former blades and power means for driving the machine.

Fig. 13 is a section on the line 13—13 of Fig. 12.

Fig. 14 is a detail in front elevation of the means for reversing the travel of the belts to cause them to be moved to the inoperative position shown in Fig. 4, and Fig. 15 is a detail plan of illustrating the construction of the former blades.

Figure 1:
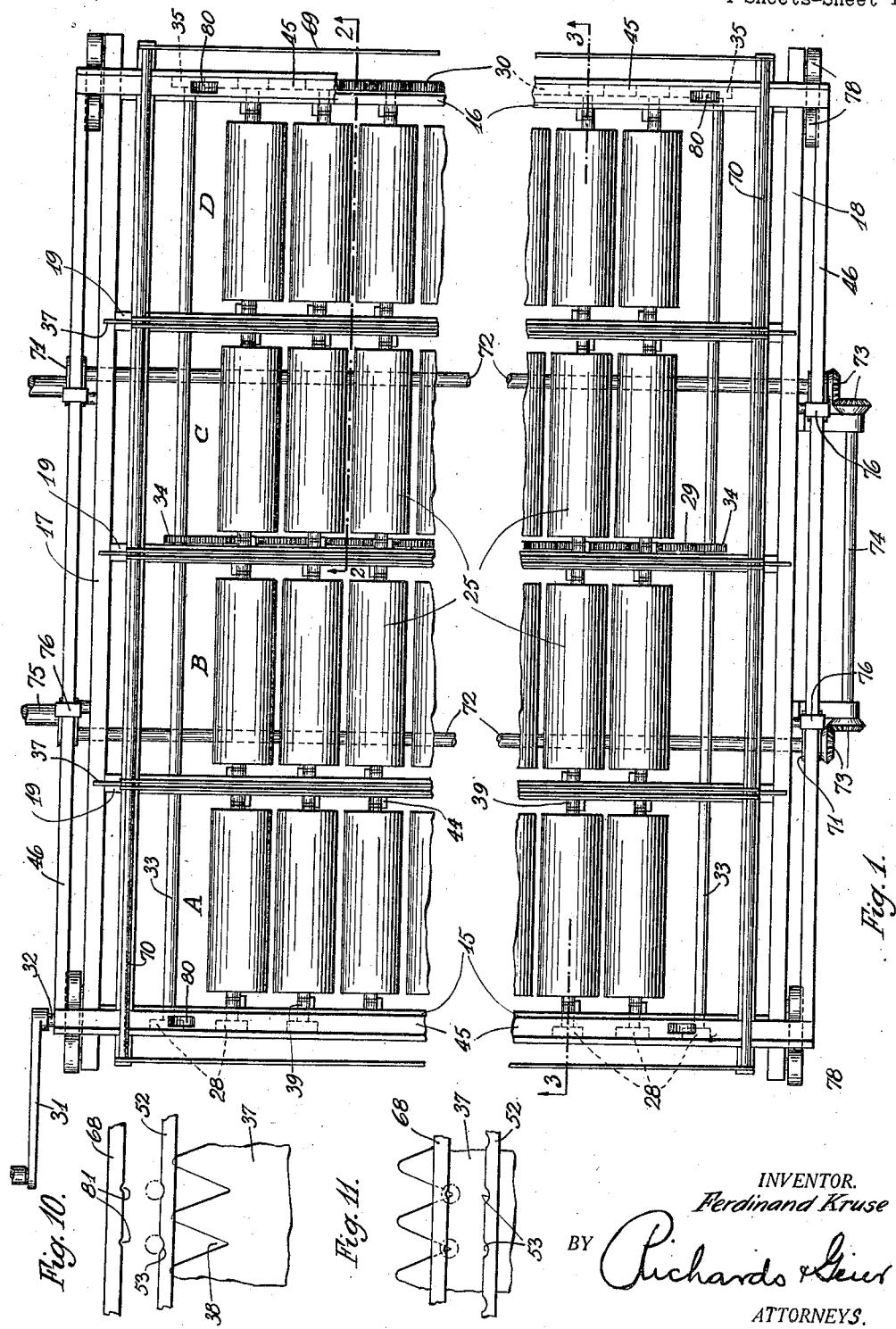
Fig. 1 is a plan view of the machine, the central part being broken away.

As shown in Figs. 1 to 11 of the drawings, a main frame is composed of the side members 15 and 16, intermediate members 19 and end members 17 and 18 secured as by the posts 20 (see Fig. 2) to any suitable support such as indicated by the numeral 21.

Extending transversely through the side and intermediate members are a plurality of shafts 22 upon which are rotatably mounted the sleeves 23 and 24. A plurality of endless belts 25 are arranged in parallel series as shown in Fig. 1 of the drawing, the series being indicated by the letters H, B, C and D in Figs. 1 and 3. The belts 25 are preferably provided with a plurality of apertures 25$^a$ to furnish a better gripping surface which will not only prevent slippage between the rolls and the belt but also between the belts and the sausages. In order not to obscure the drawings only a few of such apertures are indicated on part of the surface of one of the belts, it being understood that all the belts will be so apertured over their whole area. The belt driving rollers 26 of the series A and C are secured directly to the shafts 22 while the driving rollers 27 for the series B and D are secured to the sleeves 23 and 24. Suitable gear trains as indicated by the numerals 28, 29 and 30 are provided for driving the rollers 26 and 27 said gearing being driven in a manner similar to that disclosed in my prior copending applications and comprising a handle 31 to actuate a shaft 32, which is provided with suitable worms 28$^a$ meshing with the worm gears 28, while shafts 33 extend transversely across adjacent the ends of the machine and are provided with gears 34 and 35 adapted to mesh with and drive the gear trains 29 and 30 respectively. The gearing is arranged to drive the sleeves 23 and 24 in the same direction but opposite to the rotation of the shafts 22. Instead of a train of spur gears such as indicated by the numerals 29 and 30, I may substitute therefor sprocket chains and a plurality of sprocket gear. Each of the intermediate frame members 19 is provided with a slot 36 in which is snugly received the intermediate former members 37, the slots 36 being of sufficient depth to hold the former members 37 in a vertical position but permitting the former members to be removed therefrom when necessary for cleaning purposes. The intermediate former members 37 are provided with a plurality of equally spaced V shaped notches 38 said notches being arranged in transverse alignment with the spaces between the vertical reaches of adjacent belts 25. Spaced equally between the V shaped notches and in alignment with the shafts 22 are a number of pairs of brackets 39, the members of each pair being arranged upon each side of the belts 25. The lower ends of the brackets are suitably secured to the main frame members and pivotally mounted between the upper ends of each pair of brackets is an upper roll carrying frame consisting of the side pieces 40 and the transverse rods 41. Each of the rods 41 is fixedly secured to the side pieces 40 and has rotatably mounted thereon an idler roll 42, the rods being tapered as indicated at 43 to hold the belts centrally of the brackets 39. Suitable stops 44 are provided on each of the brackets 39 for a purpose which will hereinafter appear.

A lifting frame is provided and comprises the side members 45 and end members 46. The side members 45 are of angle shape to provide a channelled track 47 on which is adapted to travel the anti-friction rollers 48 mounted in brackets 49 secured to the side members 50, of a separate frame, said side members 50 being connected by the end members 51. Extending longitudinally between the end members 51 are a number of sausage supporting members 52 which are provided with a plurality of spaced notches 53 said notches being spaced so as to align with the spaces between the belts 25 and with the V shaped notches 38. Secured at intervals along the side members 50 of the separate frame and alternately in alignment with the notches 53 are a plurality of end formers 54. It will be noted (see Fig. 7) that the end formers 54 are arranged in staggered relation upon the opposite sides of the separate frame.

The end formers 54 are pivotally mounted upon small brackets 55 by means of the pivot pins 56 and a rod 57 which extends longitudinally in parallelism with the side member 50 and passes through a suitable aperture in each of the end formers. Coiled springs 58 connect the ends of the rods 57 with studs 59 projecting from ends of the separate frames and normally hold the rods 57 in engagement with the stops 60 mounted upon the side members 50. The purpose of this construction is to hold the end formers normally in position shown at the left hand side of Fig. 8 but permitting the formers to yield inwardly to prevent undue tension upon the casings due to the shortening of the casings caused by the twisting thereof.

The end formers along one side of the machine namely the right hand side in Figs. 7 and 8, are provided with a special mounting to permit the formers to be released and moved downwardly to the position shown in Fig. 9 thereby allowing the casings to be readily removed from the frame after the twisting operation is completed. This construction is as follows, the studs 59 instead of being secured directly in the side members 50 project outwardly from the ends of hinge members 61 which are pivoted to the side members 50 and are provided with a hook portion 62 with which is adapted to be engaged a locking bar 63 extending longitudinally and in parallelism with the side member 50. The locking bar is secured to one end of the links 64 (see Fig. 7) pivoted as at 65 to the end members 51 and is provided at one end with an actuating handle 66. Coil springs 67 connect the other ends of the links 64 with the end members 51 and normally hold the locking bar in position to engage the hinge members 61 and to hold the end formers in operative position.

The movable formers 68 (see Fig. 2) which cooperate with the intermediate formers 37 in the modification shown in Figs. 1 to 11 are mounted upon the lifting frame, to the side members 45 of which are secured spacing bars or brackets 69 between the upper ends of which extend the rods 70. Secured to and extending transversely to the rods 70 and in alignment with the intermediate formers 37 are the movable formers 68.

Means are provided for raising and lowering the lifting frame and with it the movable former blades 68 and comprises the operating arms 71 (see Figs. 1 and 2) secured to the shafts 72 in alignment with the end members 46 of the lifting frame, there being two shafts 72 connected to move in unison by means of the bevel gears 73 and the transverse shaft 74. Each of the operating arms 71 is provided with an actuating handle 75 there being two arms upon each shaft 72 and 71, a suitable stop 75a being provided to limit the movement of the arms 71. The upper ends of the arms 71 have pivoted thereto the stirrups 76 which engage around the lifting frame end members 46 and serve to force the movable former blades 68 downwardly into the casings when the handles 75 are acutated to lower the lifting frame. Means for guiding the lifting frame consists of the guide rods 77 secured to and depending from the side members 45. The guide rods 77 pass between and are engaged by the guide rollers 78 rotatably mounted on studs 79 secured to the end members 17 of the main frame.

Each of the tracks 47 of the lifting frame side members 45 is provided with a pair of depressions 80, each of which is situated adjacent the ends of the members 45 and serve as stops or locating means to engage the rollers 48 and hold the separate frame with the casings thereon in alignment with the spaces between the belts 25 and the V shaped notches 38 of the intermediate formers. The movable former blades are preferably provided with the small notches 81 as shown in Fig. 11.

The operation of the modification shown in Figs. 1 to 11 is as follows:—

The machine is preferably situated adjacent a work bench so that the tracks 46 of the lifting frame will be in the same horizontal plane as the tops of the bench with the lifting frame is in the upper position. A number of separate frames are provided upon which a workman will thread the casings before they are placed in the machine. It will be understood that the end formers will be locked in operative position by the locking bar 63 and that the casings will be placed in the notches 53 of the supporting members 52 and passed around and engaged within the notches in the end formers 54. Assuming that the lifting frame is raised as shown in Fig. 2, the separate frame is then rolled into the machine with the rollers 48 engaging the track 47. The channelled shape of the track 47 will insure the proper transverse positioning of the separate frame and the rollers 48 engaging with the depressions 80 will properly position the separate frame longitudinally of the machine. The handles 75 are then actuated to lower the lifting frame and the separate frame supported thereby, the sausage casings passing downwardly between the spaces between the belts and resting within the V notches 38 in the intermediate formers. The continued actuation of the handles 75 will then bring the movable former blades down into engagement with the casings and will press the sausage meat into the casings to each side of the formers. After the lifting frame has been moved to the downward limit of its travel, the handle 32 is then rotated a few turns to operate the belts 25. The first motion of the handle 32 to turn the belts 25 in the direction of the arrow P, Fig. 4, will cause the belts which we will assume have been in the open inoperative positions shown in Fig. 4 to rotate the top roller frames upon their pivotal points and cause the top roller frames to move to the position shown in Fig. 5. This movement of the top roller frames is caused by the frictional drag upon the non rotatable rods 41 by the movement of the belts 25 and effectively causes the rotation of the frames, the stops 44 serving to limit the movement of the top roller frames to the positions shown in Figs. 4 and 5. A few turns of the handle 72 is sufficient to twist the sausages, it being understood that the opposing faces or vertical reaches of the belts will be moved in opposite directions and that the belts of the series A and C will rotate oppositely to the belts of series B and D. If the casings have been threaded upon the separate frame with little or no slack, the twisting of the casings obviously will tend to shorten and place an undue tension upon them, causing them to break. In order to obviate this objectionable feature, the pivotal mounting of the end formers 54 in combination with the springs 58 will permit the end formers 54 to yield inwardly and compensate for this shortening effect. After a few turns of the handle 72 have been given to turn the belts in the direction indicated by the arrow P, Fig. 4, the handle is given a sufficient reverse rotation to turn the belts in the direction of the arrow R in Fig. 5, the frictional drag of the belts upon the rods 41 moving the top roller frames back to the position shown in Fig. 4.

The handles 75 are then actuated to raise the lifting frame to its upper position and the separate frame may then be slid outwardly from the machine preferably by inserting another frame which has been filled with casings into the machine.

The frame containing the twisted sausages is then placed upon a work bench, the handle 66 is actuated to move the locking bar 62 inwardly out of engagement with the hinge members 61 and to permit the end formers to drop inwardly to the position shown in Fig. 9, thus allowing the casings to be readily lifted and removed to the smoke house.

The central intermediate member of the separate frame is preferably omitted so as to leave a clear space, so that when the frame holding twisted sausages is removed from the machine it may so be placed over a smoke stick to cause the central parts of the casings to be directly over the smoke stick. The smoke stick is then lifted to engage the twisted sausages which are then raised by the stick clear of the frame and are carried to the smoke house.

Referring to the modification shown in Figs. 12 to 15, the construction of the frame work of the machine, the manner of mounting and releasing the belts, and the driving means therefor are similar to that shown and described in Figs. 1 to 11 inclusive. Means are provided for operating the machine by power and automatically cutting out the power drive at the end of a predetermined movement as follows:

Secured upon the shaft 32 at any suitable point is a sprocket wheel 90 which is connected by means of sprocket chain 91 and sprocket 92 secured to countershaft 93. Rotatably mounted on countershaft 93 is a worm gear 94, meshing with a worm 95 upon a transverse shaft 96, which is actuated by any suitable power means. Projecting inwardly from the face of worm gear 94 is a lug 97 which is adapted to be engaged by a plunger 98, slidable longitudinally within a suitable pocket 99 in a member 100 secured to shaft 93. A spring 101 is placed between the end of plunger 98 and the bottom of pocket 99 to normally urge the plunger 98 towards worm gear 94 in position to be engaged by the lug 97.

Plunger 98 is cut away to provide a shoulder 102 with which the curved, tapered, cam face 103 of a rod 104 is adapted to engage and withdraw the plunger out of the path of movement of lug 97 against the action of spring 101, while the member 100 has a groove 105, cut therein in which the lower curved tapered cam face 103 of rod 104 rides. Rod 104 is pivoted intermediate its ends as at 106 to the support 20 and has secured to its outer end one end of the spring 107, the other end of which is anchored to any suitable stationary support. The inner end of rod 104 has secured thereto in any suitable manner, as by slot 104$^a$ and plate 104$^b$, the outer end of one arm 109 of a bell crank lever pivoted as at 110 to a bracket 111 extending downwardly from the main frame of the machine. The other arm 112 of the bell crank lever extends upwardly and terminates in a handle 113 at a convenient position to be grasped by the operator.

Manual means are provided to cause a reverse movement of the belts 25 opposite to that produced by the power drive and may consist of a handle 114 rotatably mounted on shaft 32. Handle 114 has pivoted thereto a spring pressed pawl 115 adapted to engage a ratchet wheel 116 secured to the shaft 32, a curved arm 117 being provided to release pawl 115 at any suitable point to prevent the handle from being carried around with the ratchet wheel 116 when the power drive is operative.

The intermediate former elements shown in Fig. 12 differ from those shown in Figs. 1 to 11 and consist of the plates 120 and 121 mounted to slide longitudinally of the machine. The plate 120 has a plurality of upwardly projecting formers 120$^a$ and the plate 121 has a plurality of similar formers 121$^a$ which have one end bent laterally to stand in alignment longitudinally of the machine with the formers 120$^a$. Each one of the formers 120$^a$ and 121$^a$ form a cooperating member of a pair having their opposed operative meeting faces rounded as shown and the cooperating members of each pair are adapted when the plates are moved longitudinally to occupy the dotted line position shown in Fig. 15, the meeting faces being in contact substantially in alignment with the center of the space between the opposed faces of the belts 25. It will be understood that there are three pairs of plates 120 and 121, a pair being located between each horizontal series of belts 25. Each of the plates 120 are connected by means of a link 123 with one end of a lever 124 the other end of which is connected by means of a link 125 with the cooperating plate 121. Levers 124 are secured upon a transverse shaft 126 having its outer end adjacent the arm 112 of bell crank lever 109, from the side of which projects a pin 127 engaging within an elongated slot 128 formed in a link 129. Link 129 is pivotally connected with an arm 130 extending radially from and secured to the shaft 125 and springs 131 are provided to normally hold the plates in full line or open position.

The operation of the modification shown in Figs. 12 to 15 is as follows:—Shaft 96 and worm 95 being continuously rotating will cause worm gear 94 to rotate on shaft 93. Spring 107 will hold lever 104 normally in position to cause the tapered cam face 103 of the lever to be in engagement with shoulder 102 and hold plunger 98 retracted and out of the path of lug 97. If it is desired to start the machine handle 113 is pulled in the direction of the arrow in Fig. 12, this will cause arm 109 of the bell crank lever to press downwardly on the inner end of the lever 104 moving it about its pivot 105 and raising cam face 103 from shoulder 102, thus permitting plunger 98 under the influence of spring 101 to move into the path of lug 97.

As lug 97 engages plunger 98, member 100 and shaft 93 will be rotated, thus rotating shaft 32 through sprockets 90, 92 and chain 91, and driving the belts 25. As handle 113 is released spring 107 will move and hold the cam face 103 into groove 105 and withdraw plunger 98 out of the path of lug 97 at the end of a complete rotation. The movement of handle 113 to start rotation of the belts will cause the plates 120 and 121 and formers 120ª and 121ª to move from the full line positions shown in Fig. 12, to the dotted line positions, thus squeezing and constructing the casings to divide them into links of the desired length. As the handle is released the springs 107, and 131, will cause the formers to be released before the twisting operation has been completed, thus simulating the twisting operation as performed by hand and preventing breakage of the casings by relieving the strain upon them during the final twisting. As the belts in the form shown in Figs. 12 to 15 are mounted in the same manner as those shown in Figs. 1 to 11, the first movement of the shaft 32 will cause the idler rolls 42 to be swung into horizontal alignment and as the sausage casings will not be engaged by the belts until they have moved to the closed position, the squeezing of the casings will take place before the twisting and the formers will be opened and the casings released practically simultaneously with the beginning of the twisting operation. A single rotation of the shaft 93 because of the gear ratio of sprockets 90, 92 will cause about three rotations of shaft 32 which will be sufficient to twist the casings, the belts stopping automatically at the end of a complete rotation of shaft 93 by the withdrawal of plunger 98 by cam face 103 of lever 104. After the stoppage of the belts 25 the handle 114 is moved upwardly about a quarter of a turn to rotate the shaft 32 in the opposite direction to that caused by the power drive thus moving the idlers 42 to the vertical position and opening the belts in the manner described in connection with Figs. 1 to 11. When the handle 114 is released it will drop downwardly, pawl 115 slipping over the teeth of ratchet wheel 116, until the pawl strikes the end of curved arm 117, which will hold the pawl disengaged during the power driving of the belts.

Claims:—

1. In a sausage twisting machine, sausage twisting means, means to operate said sausage twisting means, and means to automatically stop the operation of said twisting means after a predetermined movement thereof.

2. In a sausage twisting machine, a plurality of endless belts, power means to drive said belt, means to connect said power means in driving relation to said belts and means to automatically disconnect said power means from said belts after a predetermined movement of the belts.

3. In a sausage twisting machine, a plurality of endless belts, power means to drive said belts, manually operable means to connect said power means in driving relation to said belts and means to automatically disconnect said power means from said belts after a predetermined movement of the belts.

4. In a sausage twisting machine, a plurality of endless belts arranged in cooperating pairs, means to rotate said belts and means to cause the opposed cooperating surfaces of the members of each pair to be moved towards and from each other to engage or disengage the sausage casing by the rotation of said belts.

5. In a sausage twisting machine, a pair of endless belts, means to rotate said belts and means to cause the opposed cooperating surfaces of the belts to be moved towards or from each other by the rotation of said belts.

6. In a sausage twisting machine, a pair of endless belts, driving rolls and idler rolls about which said belts are trained and means to cause the opposed cooperating surfaces of said belts to be moved by the friction between said belts and rolls towards or from each other to engage or disengage the sausage casing.

7. In a sausage twisting machine, a pair of endless belts, driving rolls and idler rolls about which said belts are trained and means to cause the opposed cooperating surfaces of said belts to be moved towards each other by the frictional effect between said belts and rolls by rotation of the belts in one direction and to be moved away from each other by rotation of the belts in the reverse direction.

8. In a sausage twisting machine, a pair of endless belts, driving rolls and idler rolls about which said belts are trained, belt rotating means comprising means to drive said belts in one direction and means to reverse the direction of rotation of the belts; and means to cause the opposed cooperating surfaces of the belts to be moved by the frictional drag of said belts into and out of engagement with the sausage casings.

9. In a sausage twisting machine, a pair of endless belts, driving rolls for said belts, a pair of idler rolls for each belt, a pivotally mounted frame for each belt upon which said idler rolls are mounted, adapted to be moved upon its pivot by the frictional drag of the belts, said frame constructed and arranged to cause said idler rolls to move the opposed cooperating surfaces of said belts into and out of engagement with the sausage casings by the movement of said frame about its pivot.

10. In a sausage twisting machine, a pair of endless belts, driving rolls and idler rolls about which said belts are trained, a pivotally mounted frame upon which certain of said rolls are mounted, stop means to hold said frame in positions substantially parallel to and transverse to the reaches of said belts, said frame constructed and arranged to move the opposed operative reaches of the belt towards each other as the frame is moved to the transverse position and away from each other as the frame is moved to the parallel position.

11. In a sausage twisting machine, a pair of endless belts, driving rolls and idler rolls about which said belts are trained, a pivotally mounted frame for each belt upon which said idler rolls are mounted, means to rotate said belts, means to cause said frame to be moved upon its pivotal axis by the frictional drag of said belts, and means to stop the movement of said frame in either of two positions in one of which positions the frame is held substantially in alignment with the reaches of said belts and in the other of which the frame is held substantially transversely to said reaches.

12. In a sausage twisting machine, a pair of endless belts, driving rolls and idler rolls about which said belts are trained, a pivotally mounted frame for each belt upon which said idler rolls are mounted, means to rotate said belts in one direction, means to rotate said belts in the reverse direction, means to produce a frictional drag between said belts and frames to cause said frame to be rotated in the direction of and by the rotation of the belts upon its pivotal axis, and means to stop the rotation of said frames in either of two positions.

13. In a sausage twisting machine, a plurality of flexible endless belts each of said belts being provided with a plurality of apertures to furnish a plurality of gripping edges.

14. In a sausage twisting machine, a pair of endless belts, driving rolls, a pivotally mounted frame for each belt comprising a pair of spaced side pieces, idler rolls rotatably mounted between and terminating short of said side pieces, fixed members extending between the ends of said idler rolls and side pieces, said idler rolls and fixed members being constructed and arranged to form a substantially continuous surface over which said belts are trained, and the side portions of said belts extending over said fixed members to produce a frictional drag as said belts are rotated whereby said frame will be rotated upon its pivotal axis.

15. In a sausage twisting machine, a pair of cooperating movable former elements to constrict the sausage casing, twisting means, means to drive said twisting means, manually operated means to connect the driving means to said twisting means and means actuated by said manually operated means to move said former elements into contacting relation.

16. In a sausage twisting machine, a pair of cooperating movable former elements, means to normally hold said former elements in inoperative position, twisting means, driving means, manually operated means to operatively connect said driving and twisting means, and means actuated by said manually operated means to move said former elements to an operative position.

17. In a sausage twisting machine, a pair of cooperating movable former elements, means to twist the sausage casing, driving means for said twisting means, means to connect said driving and twisting means, means to automatically disconnect said driving and twisting means after a predetermined twisting operation, means to move said former elements into operative contacting relation simultaneously with the actuation of said twisting means and means to release said former elements before the completion of the twisting.

18. In a sausage twisting machine, a pair of cooperating endless belts, means to cause the opposed cooperating reaches of said belts to be moved into engagement with the sausage casing, means to rotate said belts, a pair of movable former elements adjacent each side of said belts, means to move said former elements into engagement with said casing simultaneously with the engagement of said belts and casing, and means to release said former elements before the completion of the twisting operation.

19. In a sausage twisting machine, a plurality of endless belts arranged in horizontally aligned series of cooperating pairs of belts, a pair of intermediate former elements mounted for longitudinal sliding movement between each series of belts, means to drive all of said belts in unison, manually operable means to operatively connect said belts and driving means, and means connecting said manually operable means and former elements constructed and arranged to move said former elements into contact with the sausage casing.

20. In a sausage twisting machine, a plurality of endless belts arranged in horizontally aligned series of cooperating pairs of belts, a pair of intermediate former elements mounted for longitudinal sliding movement between each series of belts, means to drive all of said belts in unison, manually operable means to operatively connect said belts and driving means, and means connecting said manually operable means with all of said former elements constructed and arranged to simultaneously move all said former elements in contact with the sausage casing.

21. In a sausage twisting machine, a plurality of endless belts arranged in longitudinally aligned series of cooperating pairs of belts, the members of each pair of belts being spaced longitudinally of the machine, and in transverse alignment with the corresponding belts of the adjacent series, a pair of plates movable longitudinally of the machine, located between each longitudinal series of belts, a plurality of former elements carried by each of said plates, the former elements of one member of the pair of plates cooperating with the former elements of the other member of the pair to constrict the sausage casing at spaced points in alignment with the spaces between each cooperating pair of belts.

22. A sausage casing machine as set forth in claim 21, in which means are provided to move the members of each pair of plates in opposite directions.

23. A sausage casing machine as set forth in claim 22, in which means are provided to normally hold said former elements in spaced inoperative positions.

24. A sausage twisting machine as set forth in claim 23, in which means are provided to move said former elements into contacting relation.

25. In a sausage twisting machine, a plurality of endless belts arranged in horizontally aligned series of cooperating pairs of vertically extending endless belts, the members of each pair of belts being spaced apart to receive a sausage casing between the vertical reaches thereof, intermediate formers between each series of belts, a removable frame upon which said sausage is threaded, end formers carried by said removable frame and a lifting carriage upon which said frame is placed after the sausages have been threaded thereon.

26. A sausage twisting machine as set forth in claim 25, in which said removable frame is provided with means to hold the casing along spaced transverse lines adapted to be brought into alignment with the spaces between the belts.

27. A sausage twisting machine as set forth in claim 26 in which said removable frame and lifting carriage are provided with means to locate said frame with the casings in alignment with the spaces between the belts.

28. In a sausage twisting machine, a plurality of endless belts, intermediate formers, a removable frame upon which the sausage casings are threaded, end formers pivotally mounted on said removable frame and means to move said end formers upon their pivotal axis to release the sausage casing.

29. In a sausage twisting machine, a plurality of endless belts, intermediate formers, a removable frame upon which the sausage casings are threaded a plurality of end formers mounted upon a common pivotal axis at each side of the removable frame, and means to move all of the formers on each side of the frame in unison to release the sausage casings.

30. In a sausage twisting machine, a plurality of endless belts, intermediate formers, consisting of a central and side formers constructed and arranged to constrict the sausage casing at a plurality of spaced points, a removable frame having means to engage and support the casing at points substantially coincident with points where the casing is constricted by said side formers and the central portion of said removable frame being open to permit the frame to be placed over a smoke stick with the constrictions caused by the central formers in engagement with the stick.

31. A sausage twisting machine as set forth in claim 25, in which said lifting carriage is provided with a track and said removable frame is provided with rollers to engage said track.

32. A sausage twisting machine as set forth in claim 25, in which said lifting carriage and removable frame are provided with means to hold said frame in alignment longitudinally and transversely of the machine.

33. A sausage twisting machine as set forth in claim 25, in which intermediate former elements are carried by said lifting carriage.

34. In a sausage twisting machine, means to contract the casings at spaced intervals to divide them into links and means to twist the casings to secure them in linked condition comprising a flexible endless belt having a plurality of apertures to furnish a plurality of gripping edges.

35. In a sausage twisting machine, means to squeeze the sausage casing to divide it into links, means to twist the casing to secure it in linked condition, and means to cause said first named means to be released before the completion of the twisting operation.

36. In a sausage twisting machine, means to squeeze the sausage casing to divide it into links and means to twist the casings to secure them in linked condition, means to cause said squeezing and twisting means to be actuated into engagement with said casings and to release said squeezing means before the release of the twisting means.

37. In a sausage twisting machine, means to squeeze the sausage casing to divide it into links and means to twist the casings to secure them in linked condition, means to intermittently actuate said twisting means into and out of engagement with the sausage casing, and means operating in timed relationship with said last named means to cause said squeezing means to squeeze said casing and remain in engagement therewith during the initial operation of the twisting means but to release said casing before the completion of the twisting operation.

38. In a sausage twisting machine, means to squeeze the sausage casing to divide it into links and means to twist the casings to secure them in linked condition, means to actuate said squeezing means into engagement with said casings, and means to actuate said twisting means into engagement with said casings, said squeezing and twisting actuating means being constructed and arranged to operate in timed relationship to cause said squeezing means to engage the casings before the engagement of the twisting means to hold said casings until they are engaged by said twisting means and to release said casings before they are released by said twisting means.

In testimony whereof I have affixed my signature.

FERDINAND KRUSE.